(No Model.)
J. M. BRUCE.
COMBINED WATER COOLER AND FILTER.
No. 315,120. Patented Apr. 7, 1885.
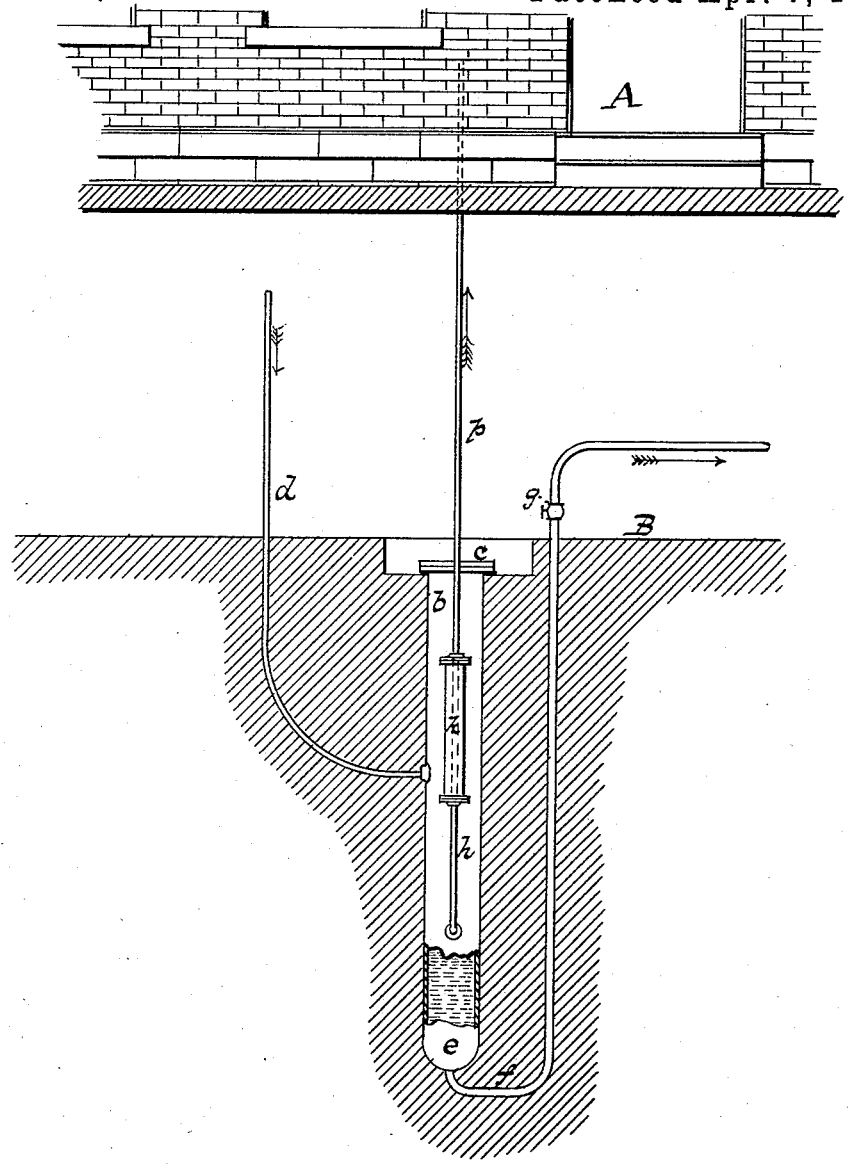

UNITED STATES PATENT OFFICE.

JOHN M. BRUCE, OF PITTSBURG, PENNSYLVANIA.

COMBINED WATER COOLER AND FILTER.

SPECIFICATION forming part of Letters Patent No. 315,120, dated April 7, 1885.

Application filed October 18, 1884. (No model.)

*To all whom it may concern:*

Be it known that I, JOHN M. BRUCE, a citizen of the United States, and a resident of Pittsburg, in the county of Allegheny and State of Pennsylvania, have invented a Combined Water Cooler and Filter, designed as a permanent attachment to dwelling-houses, of which the following is a specification.

Heretofore many efforts have been made to purify water by mechanical means; but very few can claim complete success, for the reason that in a very short time the contrivance becomes clogged with accumulated impurities, and no provision having been made for removing the same the apparatus is soon thrown aside as worthless.

The object of my invention is to provide a means whereby a constant supply of water may be cooled, purified, and otherwise made fit for domestic purposes, and in such a manner as that the cooling and filtering may be kept in continual use and the apparatus cleansed of accumulated deposits without stopping the flow of purified water.

To accomplish the object of my invention, I embed in the moist earth, and in a vertical position or otherwise beneath a dwelling-house, A, or some other convenient and suitable locality, a large iron cylinder or strong tube, b, that is closed at its lower end and fitted with a perfectly-tight lid, c, at its top, after the manner shown in the accompanying drawing, which represents the cylinder as having a portion of its side broken out and removed for the purpose of exhibiting its interior.

Extending from a street-main or other conduit is a pipe, d, leading to and communicating with the large vertical cylinder b, whereby a constant and continual force of water under pressure is supplied thereto; and from the concave bottom e of this large cylinder b another pipe, f, is carried above the surface of the earth B, and provided with a cock or valve, g, through which any deposit of foreign matter that accumulates in the bottom of the cylinder b may be forced out for the purpose of cleansing the same. The large cylinder b is also provided with an additional small pipe, h, connected thereto at such a distance above its bottom as to prevent any reasonable amount of deposit from interfering therewith. The upper end of this pipe h enters a vertical and water-tight chamber, k, filled with coarse sand or silex, combined with charcoal or other good and sufficient filtering medium, through which the water, by reason of its pressure, is made to ascend and pass through a suitable pipe, P, into the house A or premises above in a cooled and purified condition.

Having thus described my invention, I claim—

1. The combined water cooler and filter herein described, consisting of a cylinder embedded in the earth, a water-supply pipe leading thereto, and a water-exit pipe provided with a cock leading therefrom, in combination with a supply-pipe leading from the cylinder to the house, said pipe being provided with a filter, substantially as described, and for the purposes set forth.

2. A cooler and filter consisting of the close vertical cylinder b, embedded in the earth for the purpose of keeping its contents cool, in combination with a pipe, d, leading to a supply of water under constant pressure, an outlet-pipe, f, in communication with and extending from the concave bottom of the cylinder upward above the earth, and provided with a cock or valve, g, through which any deposit of foreign matter within the cylinder may be forced out, a pipe, h, entering a chamber, k, filled with any good filtering medium or substance, and a delivery-pipe, p, leading therefrom into a dwelling-house, A, or other desirable points or places, as shown and described, for the purposes intended.

JNO. M. BRUCE.

Witnesses:
JOHN S. KENNEDY,
JOSIAH W. ELLS.